United States Patent [19]

Polach et al.

[11] Patent Number: 4,622,051
[45] Date of Patent: Nov. 11, 1986

[54] ARRANGEMENT FOR REMOVING SOOT PARTICLES AND OTHER SOLID PARTICLES FROM EXHAUST GAS OF POWER VEHICLES

[75] Inventors: Wilhelm Polach, Möglingen; Klaus-Dieter Zimmermann, Vaihingen, both of Fed. Rep. of Germany

[73] Assignee: Robert Bosch GmbH, Stuttgart, Fed. Rep. of Germany

[21] Appl. No.: 807,439

[22] Filed: Dec. 9, 1985

[30] Foreign Application Priority Data

Jan. 25, 1985 [DE] Fed. Rep. of Germany ....... 3502448

[51] Int. Cl.$^4$ ............................................. B01D 45/00
[52] U.S. Cl. ....................................... 55/417; 55/124; 55/429; 55/DIG. 30; 55/459 R; 55/338; 60/275; 60/311
[58] Field of Search ................. 55/DIG. 30, 124–126, 55/127, 338, 150, 152, 417, 293, 302, 315, 429, 459 R; 60/311, 275

[56] References Cited

U.S. PATENT DOCUMENTS 2,276,805  3/1942  Tolman ................................. 55/302
2,368,787  2/1945  Skinner ................................ 55/302
4,326,862  4/1982  Suzuki ................................. 55/127

FOREIGN PATENT DOCUMENTS 3141156  4/1983  Fed. Rep. of Germany .
3404988  2/1984  Fed. Rep. of Germany .

*Primary Examiner*—Bernard Nozick
*Attorney, Agent, or Firm*—Michael J. Striker

[57] ABSTRACT

An arrangement for removing soot particles and other solid particles from exhaust gas of power vehicles, comprises a soot deflector arranged to receive exhaust gas and having a first outlet for a cleaned exhaust gas stream and a second outlet for a soot-containing exhaust gas stream, and a soot collector connected with the second outlet and arranged for removing soot, the soot collector being formed as an exhaust gas-impermeable collecting container fixedly mountable in a power vehicle, the collecting container having a soot removing pipe arranged to extend through a vehicle wall outwardly and having a closeable and openable end, the collecting container also having a filter-covered exhaust gas outlet pipe, the soot collector having a removable closing cover arranged to close and to open the one end of the soot removing pipe, and a filter which covers the exhaust gas outlet pipe.

12 Claims, 2 Drawing Figures

Fig. 1

ARRANGEMENT FOR REMOVING SOOT PARTICLES AND OTHER SOLID PARTICLES FROM EXHAUST GAS OF POWER VEHICLES

BACKGROUND OF THE INVENTION

The present invention relates to an arrangement for removing soot particles and other solid particles from exhaust gas of power vehicles, and particularly for such an arrangement which includes a soot deflector and a soot collector connected therewith.

Arrangements of the above-mentioned general type are known in the art. It is known to provide industrial power vehicles, such as passenger buses, fork lifts, construction machines and the like with soot collectors formed as exchangeable collecting bags which are similar to paper bags of vacuum cleaners. They can be exchanged during intervals between operation of the vehicle for example during the fueling, or as at the end of day travels. The soot-filled filter bag is then burnt in a stationary combustion installation in a nonharmful manner, as disclosed for example in the German patent application No. P 3 404 488.6. Since the filtering action of the collecting bag can be not complete, the filter chamber around the collecting bag is dirtied very fast so that the exchange of the collecting bag is not only a dirty work, but also because of the not small soot precipitation a part of removal efforts is wasted. Moreover, in the event of great bag volumes of up to 10, particularly for passenger buses, the exchange of the collecting bags requires an additional easily accessible opening flap in the vehicle chassis.

SUMMARY OF THE INVENTION

Accordingly, it is an object of the present invention to provide an arrangement for removing soot particles and other soiled particles from exhaust gas of power vehicles, which avoids the disadvantages of the prior art.

In keeping with these objects and with others which will become apparent hereinafter, one feature of the present invention resides, briefly stated, in an arrangement for removing soot particles and other solid particles from exhaust gas of power vehicles, in which a soot collector is formed as an exhaust gas-impermeable collecting container which is fixedly installable in a power vehicle, and the collecting container has a removing pipe which extends through a vehicle wall outwardly and closeable at its one side by removable closure cover, and a filter coated exhaust gas outlet pipe.

Through the outwardly extending removing pipe the contents of the soot-filled collecting container can be withdrawn by suction without difficulties. Dirtying of the vehicle or the surrounding area of the vehicle is reliably prevented. The emptying of the collecting container is connected with only small time consumption and can be performed for example parallel with refueling of the vehicle.

In accordance with a further advantageous feature of the present invention, a soot filter is arranged in the collecting container so that the interior of the latter is subdivided into a lower container chamber which faces toward the bottom and an upper container chamber which faces away from the bottom, and the exhaust outlet pipe is opened into the upper container chamber while the second outlet of the soot deflector opens through an inlet pipe into the lower container chamber.

The soot filter guarantees that the exhaust gas stream which leaves the collecting container via the exhaust gas outlet pipe has no residual particles and the exhaust gas is free from solid particles to a high degree. Thereby the exhaust gas return to the combustion engine of the power vehicle with clean gas required for improvement of the exhaust gas is possible.

In accordance with a further advantageous feature of the present invention an exhaust gas conduit is provided with a manually actuatable throttling flap which is located behind a point of opening of the exhaust gas outlet pipe into the exhaust gas conduit, as considered in flow direction of the exhaust gas. In this case, the emptying of the collecting container can be performed independently on an underpressure or overpressure in the stationary removing (emptying) installation. After fitting of a removing hose which leads to the removing installation, or to the removing pipe without the cover, the vehicle motor can be run in idling mode. The throttling flap is moved to its position in which it locks the exhaust gas conduit. Thereby the exhaust gas counterpressure increases and the soot is blown from the collecting container via the removing hose into the removing installation. Simultaneously, the soot filter is flushed back with cleaned exhaust gas which is supplied via the exhaust gas of the pipe from the exhaust gas conduit into the collecting container and therefore the soot filter is cleaned and relieved from deposits.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
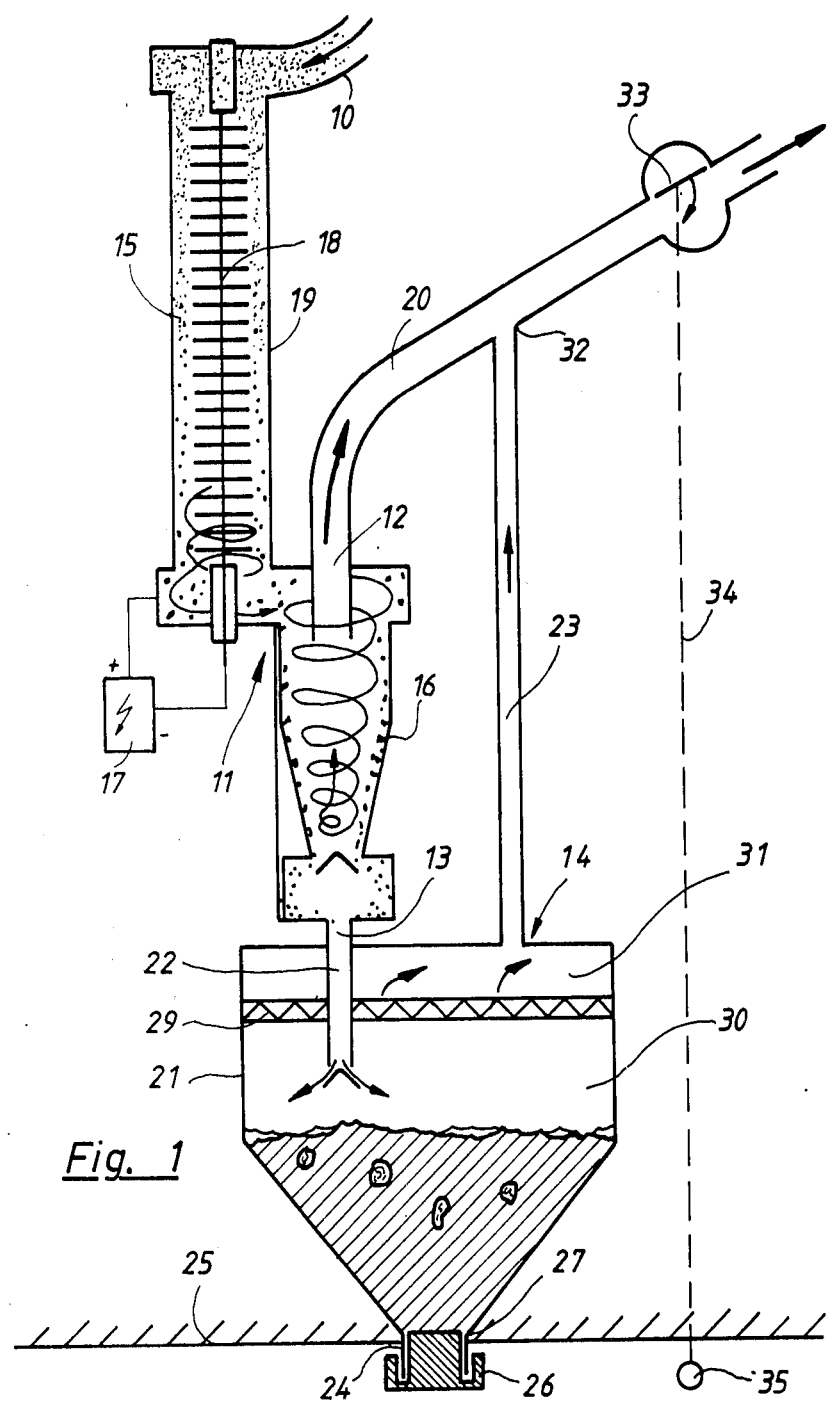
FIG. 1 is a view schematically showing an arrangement for removing soot particles and other solid particles from exhaust gas of power vehicles, in accordance with the present invention.

FIG. 1 schematically shows a longitudinal section of an arrangement for removing soot particles and other solid particles from exhaust gas supplied via a connecting conduit 10 from an exhaust gas collecting system of an internal combustion engine of a vehicle. The arrangement has a soot deflector 11 with a first outlet 12 for a cleaned exhaust gas stream and a second outlet 13 for a soot-containing exhaust gas stream. It has further a soot collector 14 which serves for removing the soot from the vehicle and is connected with the second outlet 13 of the soot deflector 11. The term "soot" is used here as a synonym of all solid particles which are present in exhaust gas of combustion engines.

The soot deflector 11 comprises in a known manner an electrofilter 15 and a centrifugal force separator for example cyclone 16. The construction and operation of the electrofilter 15 and the cyclone 16 are described in the DE-OS No. 3,141,156 and therefore is dispensed with hereinbelow. It should be mentioned that in the electrofilter 15 a high voltage field is generated by a high voltage source 17 between a central electrode 18 and a housing 19 of the electrofilter 15. This high voltage field causes an agglomeration of the soot particles to larger soot flakes. The soot flakes are deposited on the walls of the cyclone 16 under the action of the centrifugal force and an accelerated rotational movement, and travel to the second outlet 13 of the deflector 11. The exhaust gas which is concentrated in the core of the cyclone 16 flows as a cleaned exhaust gas via the first outlet 12 of the deflector 11 into an exhaust pipe 20. The first outlet 12 is formed as a spray nozzle pipe.

The soot collector 14 is formed as an exhaust gas-impermeable collecting container 21 which is fixedly installed in the vehicle and is formed of a metal sheet or synthetic plastic material. It has an inlet pipe 22 which is formed as a spray nozzle pipe and connected with the second outlet 13 of the deflector 11. It also has an exhaust gas outlet pipe 23 which is connected with the exhaust pipe 20. Finally it has a removal pipe 24 which extends outwardly through a chassis wall 25 of the vehicle and is closed at its one side with a removable closing cover 26. The removal pipe 24 extends downwardly from a bottom 27 of the collecting container 21. The collecting container 21 narrows downwardly toward the bottom 27 in a funnel-shaped manner. The removal pipe 24 has an end which is closed by the closing cover 26 and is formed so that a removal hose 28 shown in FIG. 2 can be fitted on this end in a soot-tight manner after removing of the closing cover.

A soot filter 29 is arranged in the collecting container 21 and formed as a filter mat. It subdivides the interior of the collecting container 21 in a lower container chamber 30 which faces toward the bottom 27, and a container chamber 31 which faces away of the bottom 27. The inlet pipe 22 which forms a spray nozzle pipe opens below the soot filter 29 into the lower container chamber 30, whereas the exhaust gas outlet pipe 23 leads from the upper container chamber 31 and opens into the exhaust pipe 20 at a location 32. A throttling flap 33 is arranged in the exhaust pipe 20 behind this location as considered in the flow direction of the exhaust gas. The throttling flap 33 is coupled with a mechanical throttling flap adjusting element 34 which extends through the chassis wall 25 over the vehicle near the removal pipe 24 and is provided at its free end with an actuating handle 35. By means of the actuating handle 35, the throttling flap 33 can be turned from its open position shown in FIG. 1 to its locking position shown in FIG. 2 in which it blocks the exhaust pipe 20, and vice versa.

The above described arrangement with the soot collector 11 and the soot collector 14 operates in the following manner:

Exhaust which flows via the connecting conduit 10 from the exhaust gas collecting system of the power vehicle motor into the deflector 11 is separated in the deflector 11 in a greater cleaned exhaust gas partial stream and a smaller soot-containing exhaust gas partial stream. The soot-containing exhaust gas partial stream amounts to approximately 1% of the total exhaust gas stream. The cleaned exhaust gas partial stream flows from the first outlet 12 of the deflector 11 into the exhaust pipe 20 and from there flows outwardly over the throttling flap 13 which is open during the operation of the motor.

The very small soot-containing exhaust gas partial stream leaves the soot deflector 11 via the second outlet 13 and flows through the inlet pipe 22 into the lower container chamber 30 of the collecting container 21. The lower container chamber 31 is covered by the soot filter 29. A significant part of the soot deposits here and substantially fills the lower container chamber 30. The carrier gas of the residual exhaust gas partial stream flows through the soot filter 29 which retains the residual suspended soot particles in greater part, and flows further via the exhaust gas outlet pipe 23 into the exhaust pipe 20 in which it joins the other exhaust gas partial stream of the combustion engine.

Figure 2:
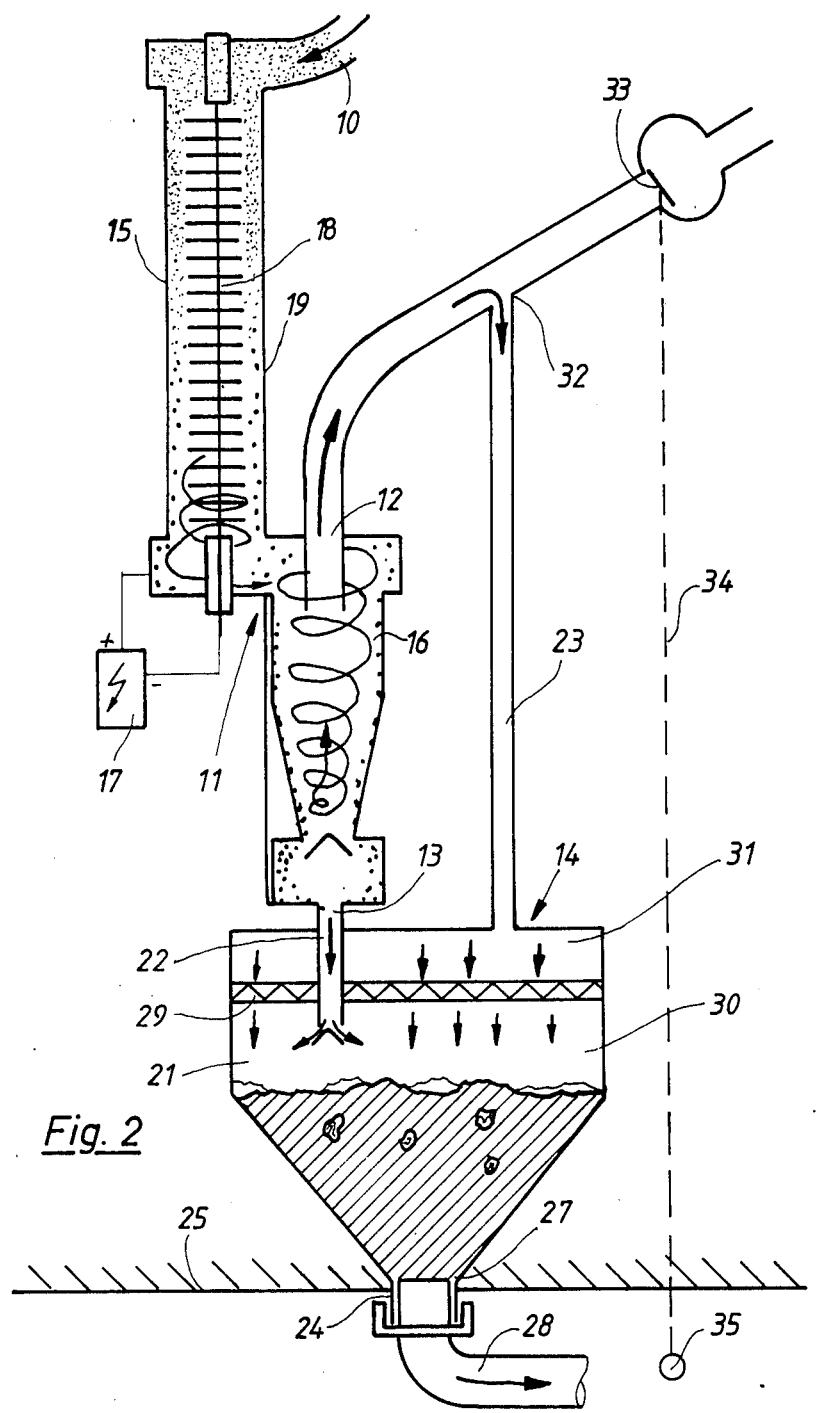
FIG. 2 is a view showing the inventive arrangement during its operation or in other words, during soot-removing process.

For emptying the collecting container 21 in a place provided for this purpose with a stationary removing device, the closing cover 26 is removed from the removal pipe 24 and the removal hose 28 connected with the removing device is fitted onto the pipe 24 as shown in FIG. 2. With running motor of the power vehicle the throttling flap 33 is brought by the actuating handle 35 to its locking position and the exhaust pipe 20 is blocked. As a result of this the exhaust gas pressure is increased and soot is blown from the collecting container 21 via the removal hose 28 into the removing device. During this process the soot filter 28 is simultaneously backwashed with cleaned exhaust gas and thereby released from soot. The free tubular cross-section of the inlet pipe 22 and the exhaust gas outlet pipe 23 are selected with such a ratio that because of the flow resistance formed in both pipes the significantly greater exhaust gas stream flows from the exhaust gas pipe 20 via the exhaust gas outlet pipe 23 into the upper container chamber 31 and from there through the soot filter 29 into the lower container chamber 30. When the lower container chamber is emptied, the removal hose 28 is removed and the closing cover 26 is again fitted onto the removal pipe 24.

The throttling flap 33 can be dispensed with when the stationary removing device is available via a suction blower so the container 21 can be emptied by suction. The fresh air supply is performed in this case via the exhaust pipe 20 from the surrounding atmosphere.

It will be understood that each of the elements described above, or two or more together, may also find a useful application in other types of constructions differing from the types described above.

While the invention has been illustrated and described as embodied in an arrangement for removing soot particles and other solid particles from exhaust gas of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for removing soot particles and other solid particles from exhaust gas of power vehicles, comprising a soot deflector cyclone arranged to receive exhaust gas and having a first outlet for a cleaned exhaust gas stream and a second outlet for a soot-containing exhaust gas stream; and a soot collector connected with said second outlet and arranged for removing soot, said soot collector being formed as an exhaust gas-impermeable collecting container fixedly mountable in a power vehicle, said collecting container having a soot removing pipe arranged to extend through a vehicle wall outwardly and having a closeable and openable end, said collecting container also having a filter-covered exhaust gas outlet pipe, said soot collector having a removable closing cover arranged to to close and to open said one end of said soot removing pipe, and a filter which covers said exhaust gas outlet pipe.

2. An arrangement as defined in claim 1, wherein said collecting container has a bottom and a cross-section reducing substantially in a funnel-shaped manner toward said bottom, said soot removing pipe being open in said bottom.

3. An arrangement as defined in claim 1, wherein said collecting container has a bottom, said filter being arranged in an interior of said collecting container so as to subdivide the interior into a lower container chamber which faces toward said bottom and an upper container chamber which faces away of said bottom, said exhaust gas outlet pipe being open in said upper container chamber whereas said second outlet of said soot deflector cyclone being open in said lower container chamber.

4. An arrangement as defined in claim 3, wherein said collecting container has an inlet pipe which communicates said second outlet of said soot deflector cyclone with said lower container chamber of said collecting container.

5. An arrangement as defined in claim 3, wherein said soot filter is formed as a filter mat.

6. An arrangement as defined in claim 1; and further comprising an exhaust conduit, said first outlet of said soot deflector being connected with said exhaust conduit, said exhaust gas outlet pipe of said collecting container being open in said exhaust conduit.

7. An arrangement as defined in claim 6, wherein said exhaust gas outlet pipe opens in said exhaust conduit in a predetermined point; and further comprising a manually operating throttling flap arranged in said exhaust conduit behind said point as considered in a flow direction of the exhaust gas.

8. An arrangement as defined in claim 7; and further comprising a throttling flap adjusting element which is connected with said throttling flap, and an actuating handle provided on said throttling flap adjusting element outside of the vehicle wall.

9. An arrangement as defined in claim 8, wherein said actuating handle is arranged substantially near said removing pipe of said collecting container.

10. An arrangement as defined in claim 7, wherein said collecting container has an inlet conduit communicating said second outlet of said soot deflector cyclone with the interior of said collecting container, said inlet pipe and said exhaust gas outlet pipe having free cross-sections which are selected with such a ratio that when said exhaust gas conduit is blocked by said throttling flap, flow resistances developed in said inlet pipe and said exhaust gas outlet pipe are such as to provide substantially greater exhaust gas stream from said exhaust gas conduit via said exhaust gas outlet pipe into said collecting container.

11. An arrangement as defined in claim 1, wherein said end of said soot removing pipe is formed so as to be connected with a soot removing conduit.

12. An arrangement as defined in claim 11; and further comprising a soot removing conduit which is formed as a hose and fitted on said end of said soot removing pipe.

* * * * *